United States Patent

[11] 3,617,163

| [72] | Inventors | Gregoire Kalopissis<br>Paris;<br>Andree Bugaut, Boulogne-sur-Seine, both of France |
|---|---|---|
| [21] | Appl. No. | 607,898 |
| [22] | Filed | Jan. 9, 1967 |
| [45] | Patented | Nov. 2, 1971 |
| [73] | Assignee | L'Oreal<br>Paris, France |
| [32] | Priorities | Jan. 10, 1966 |
| [33] | | Luxembourg |
| [31] | | 50,233;<br>June 24, 1966, Luxembourg, No. 51,408;<br>Dec. 9, 1966, Luxembourg, No. 52,555 |

[54] BASIC DYES FOR USE IN COLORING HAIR
4 Claims, No Drawings

[52] U.S. Cl. ...................................................... 8/10,
8/10.1, 8/39, 8/41, 260/205, 260/207.5, 260/372,
260/374, 260/377, 260/378, 260/381, 260/556 B,
260/570.5 C, 260/570.8 R, 260/574

[51] Int. Cl. ...................................................... A61k 7/12

[50] Field of Search............................................ 260/205,
207.5, 378; 8/10, 10.1, 39, 41

[56] References Cited

UNITED STATES PATENTS

| 2,238,485 | 4/1941 | Dickey et al. ................. | 260/205 |
| 2,888,379 | 5/1959 | Bruning et al. ................ | 260/309.6 X |
| 3,100,739 | 8/1963 | Kaiser et al. .................. | 8/10.1 |
| 3,442,599 | 5/1969 | Kalopissis et al. ............ | 8/10.1 |

FOREIGN PATENTS

| 1,401,163 | 4/1965 | France ......................... | 260/378 |
| 306,992 | 7/1955 | Switzerland .................. | 260/378 |

*Primary Examiner*—Albert T. Meyers
*Assistant Examiner*—Vera C. Clarke
*Attorney*—Holcombe, Wetherill & Brisebois

ABSTRACT: A hair dyeing composition comprises an aqueous solution of a hair coloring amount of a dye compound having the formula A–NR–(CH$_2$)$_n$–NHR' wherein R and R' each independently are selected from the group consisting of hydrogen, lower alkyl and lower alkoxy, $n$ is an integer of 2–6 and A is selected from the group consisting of anthroquinone, azo and benzene. The composition contains 0.01 to 3 percent of said dye compound and has a pH of about 4–10.

BASIC DYES FOR USE IN COLORING HAIR

SUMMARY

This invention relates to new coloring compositions for dyeing hair.

The object of the present invention is to provide a new article of manufacture consisting of a coloring composition for human hair. This composition is essentially characterized by the fact that it contains, in solution, at least one compound having the following general formula:

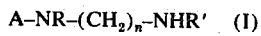

A–NR–(CH$_2$)$_n$–NHR'   (I)

in which R and R' may be identical or different and represent a hydrogen atom, a lower alkyl radical or a lower hydroxyalkyl radical; in which $n$ is a whole number between 2 and 6 inclusive, and in which the radical A represents either:

1. An anthraquinone radical having the formula:

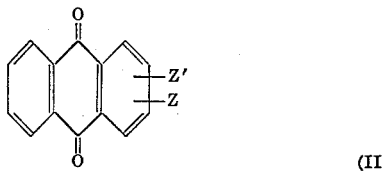

(II)

in which the case R in formula (I) always represents a hydrogen atom, while in formula (II) Z' represents a hydrogen atom or an NHR$_1$ group, in which R$_1$ may be a hydrogen atom, or a lower alkyl radical, and Z represents a hydrogen atom or an NRR'' group, in which R has the significance hereinbefore indicated, and R'' is a hydrogen atom, a lower alkyl group or a –(CH$_2$)$_n$–NHR' group, in which R' and $n$ have the significances hereinbefore indicated, it being understood that on the anthraquinone ring the NR–(CH$_2$)$_n$–NHR' chain specified in formula (I) may occupy only:

a. Position 1, in which case the Z' radical represents a hydrogen atom, and the Z radical, if it represents anything other than a hydrogen atom, can occupy only positions 4, 5 or 8, or
b. Position 2, in which case the radicals R', Z and Z' each represent a hydrogen atom, or
c. Position 5, in which case R' must represent a hydrogen atom, the Z' radical represents an NHR$_1$ group in position 4 and the Z radical represents an NHR$_2$ group in position 1, in which last mentioned group R$_2$ represents a hydrogen atom or a lower alkyl radical and R$_1$ and R$_2$ may be identical or different; or 2. An azo radical having the formula:

B$_1$–N  N–B$_2$   (III)

in which B$_1$ and B$_2$ each represent an aromatic or heterocyclic group which may or may not be substituted by one or more nitro, halogen, alkyl, hydroxy, or aminoacyl groups; or 3. A benzene ring having the following formula:

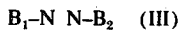

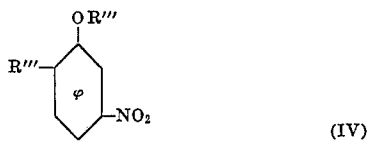

(IV)

in which R''' represents a hydrogen atom or a lower alkyl radical with the NR–(CH$_2$)$_n$–NHR' chain in para position with respect to the alkoxy group and in which R represents a hydrogen atom and R' has the significance hereinbefore indicated.

The dyes of formula (I) have several advantages; for example, their great affinity for keratinic fibers makes colors thus obtained very resistant to shampooing. Moreover, these dyes provide a great range of shades, running from yellow to blue, which are not adversely affected by light over long periods of time.

In addition, the dyes used to prepare the coloring compositions according to the invention have the advantage of being soluble in water for a pH range of from 4 to 10. To adjust the pH, an organic or mineral acid such as lactic acid or hydrochloric acid may be used.

The period during which the aforesaid coloring solutions are in contact with the hair may vary greatly, preferably from 5 to 30 minutes. The temperature at which these coloring solutions are applied may also be varied but in most cases they may be used at ordinary temperatures. The concentration of dyes of formula (I) in the coloring compositions may also be varied, but this concentration should preferably be between 0.01 percent and 3 percent.

The new dyes may be mixed with each other or with other dyes usually employed for dyeing hair.

Moreover, the coloring compositions according to the invention may contain such generally used ingredients as dispersing or wetting agents, thickeners, detergents, softeners, and perfumes.

Among the compounds described above as serving as active products for coloring compositions according to the invention are certain new chemical compounds. Therefore another object of the present invention is to provide, as new articles of manufacture, the new chemical compounds having the following general formula:

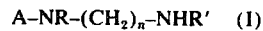

A–NR–(CH$_2$)$_n$–NHR'   (I)

in which R and R' may be identical or different and represent a hydrogen atom, a lower alkyl radical or a lower hydroxyalkyl radical; in which $n$ is a whole number between 2 and 6 inclusive; in which the radical A represents either:

1. A nonsubstituted anthraquinone radical in which case the NR–(CH$_2$)–NHR' chain is in position 2, R and R' representing hydrogen atoms; or 2. An anthraquinone radical having the formula:

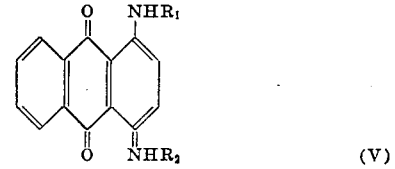

(V)

in which R$_1$ and R$_2$ may be identical or different and represent a hydrogen atom, or a lower alkyl radical, it being understood that on the anthraquinone ring, the NR–(CH$_2$)$_n$–NHR' chain specified in formula (I), may occupy only position 5, with R and R' necessarily representing a hydrogen atom; or 3. a paranitro-phenylazophenyl having the formula:

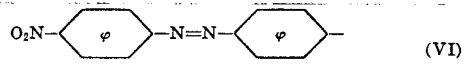

(VI)

it being understood that the chain –NR–(CH$_2$)$_n$–NHR' which appears in general formula I is attached in position 4, while position 4' is occupied by the nitro group.

Another object of the present invention is to provide a process for dyeing keratinic fibers, which is essentially characterized by the fact that the fibers to be treated, particularly hair, are impregnated with a coloring composition according to the invention. This composition is left on for 5 to 30 minutes; then the hair is rinsed and dried.

The compounds of formula (I) in which the radical A represents a radical having the above-indicated formula (II) with an NH–(CH$_2$)$_n$–NHR' chain in position 1, may be prepared in the usual manner, by condensing a diamine having the formula NH$_2$–(CH$_2$)$_n$–NHR' on an anthraquinone derivative which is α-monohalogenated or dihalogenated in position 1,5 or 1, 8, or even on quinizarine.

Those compounds according to formula (I) in which the radical A represents a radical of formula (II) and which have a NH–(CH$_2$)–NH$_2$ chain in position 2 may be prepared, in a known manner, form 2-aminoanthraquinone by reacting an αω-di-halogenoalkane with an alkaline derivative of an 2-arylsulfonylaminoanthraquinone, then condensing the resulting halogenated derivative on potassium phthalimide and finally hydrolyzing the resulting phthalimide derivative, first with sulfuric acid and then with hydrazine hydrate.

Those compounds according to formula (I) in which the radical A represents a radical of formula (II) and which have a NH–(CH$_2$)–NH$_2$ chain in position 5 may be prepared, in a known manner, by condensing a diamine responding to the formula NH$_2$–(CH$_2$)$_n$–NH$_2$ on 1,4-diamino-5-nitroanthraquinone.

Compounds of formula (I), in which the radical A represents a radical of the above-indicated formula (III), may be obtained in the usual manner by combining the diazonium salt of the amine B$_1$–NH$_2$ with the amine B$_2$–NR–(CH$_2$)$_n$–NHR′.

Compounds of formula (I) in which the radical A represents a radical of the above-indicated formula (IV) may be obtained in the usual manner from amines of the formula:

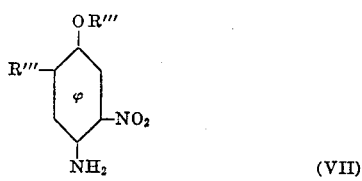

(VII)

by bonding a –(CH$_2$)$_n$–NHR′ group to the NH$_2$ group of the aromatic ring.

In order that the invention may be better understood, several examples of the preparation and use of the dyes according to formula (I) will now be described, purely by way of illustration without limiting the scope of the invention to the details thereof.

EXAMPLE I

Preparation of 4-methylamino-1-(β-aminoethyl)-aminoanthraquinone

The reaction used in preparing this compound may be diagrammatically represented in the following manner:

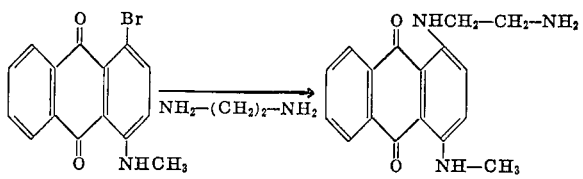

A toluenic solution of 4-methylamino-1-bromoanthraquinone is heated to reflux for several hours with an excess of ethylenediamine. After cooling, the toluenic solution is treated several times with a solution of normal hydrochloric acid. The hydrochloric extracts are collected, and then rendered alkaline in order to liberate the desired base, which is extracted by means of a ethyl acetate. Oxalic acid is added to this ethyl acetate solution and the desired amine is precipitated in the form of oxalate which is then dried.

The corresponding base is liberated by rendering the solution alkaline and is isolated in the usual manner. It melts at 168° C. after being crystallized in toluene.

4-methylamino-1-(β-acetylaminoethyl)-aminoanthraquinone is prepared from this base by adding acetic anhydride to a solution of 4-methylamino-1-(β-aminoethyl)-aminoanthraquinone in ethyl acetate. This monoacetate, recrystallized in normal propyl alcohol melts at 220° C. Analysis yields the following results:

| Analysis | Calculated for C$_{19}$H$_{19}$N$_3$O$_3$ | Found |
|---|---|---|
| C % | 67.65 | 67.50–67.44 |
| H % | 5.64 | 5.86–5.84 |
| N % | 12.46 | 12.20–12.22 |

EXAMPLE II

Preparation of 4-methylamino-1-(β-aminopropyl)-aminoanthraquinone

The reaction used to prepare this compound may be diagrammatically represented in the following manner:

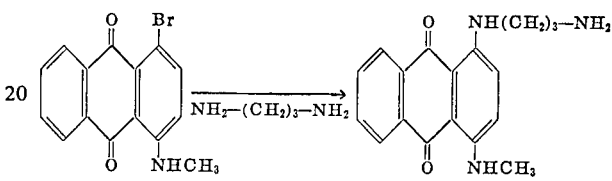

A solution of 4-methylamino-1-bromoanthraquinone in a solvent such as toluene is heated to reflux for several hours with an excess of 1,3-diaminopropane. After the reaction mixture has been treated in a manner similar to that described in example I, the 4-methylamino-1-(γ-aminopropyl)–aminoanthraquinone is isolated and after being crystallized in toluene, melts at 142° C.

The calculated molecular weight of this compound is 309. The molecular weight found experimentally by potentiometric determination is 303.

The monoacetate obtained from this base melts at 224° C.

EXAMPLE III

Preparation of 1-(γ-aminopropyl)-aminoanthraquinone

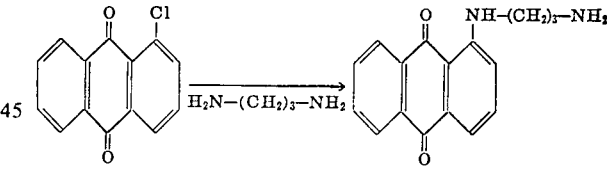

A solution of 1-chloroanthraquinone in a solvent such as toluene is heated to reflux for several hours with an excess of 1,3-diaminopropane. After cooling, the toluenic solution is treated several times with a solution of normal hydrochloric acid. The hydrochloric extracts are collected, and then rendered alkaline in order to liberate the desired base, which cyrstallizes. After drying and recrystallization in toluene, it melts at 152° C.

1-(γ-acetylaminopropyl)–aminoanthraquinone is obtained from this base by adding acetic anhydride to a solution of 1-(γ-aminopropyl)–aminoanthraquinone in ethyl acetate. This monoacetate recrystallized in ethyl alcohol, melts at 202° C. Analysis yields the following results:

| Analysis | Calculated for C$_{19}$H$_{18}$N$_2$O$_3$ | Found |
|---|---|---|
| C % | 70.81 | 70.73–0.70 |
| H % | 5.59 | 5.61–5.62 |
| N % | 8.69 | 8.54–8.45 |

EXAMPLE IV

Preparation of 1-(β-aminoethyl)-amino-2-nitro-4-methoxybenzene

The process used to synthesize this compound may be diagrammatically represented in the following manner:

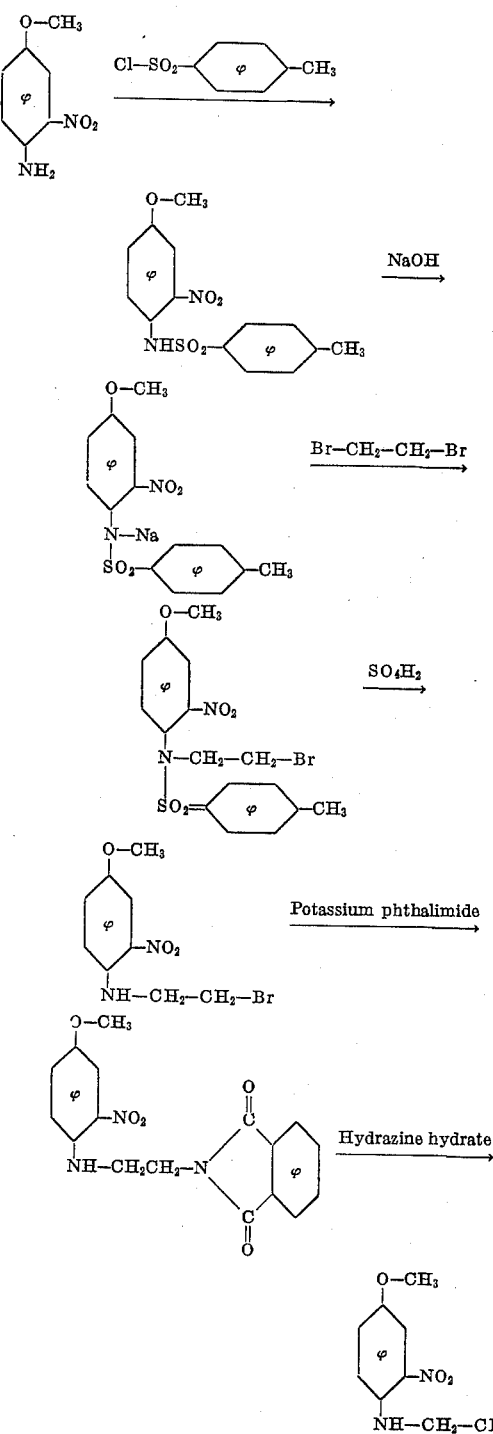

It may be noted that the brominated derivative obtained at the end of the fourth step in this method of preparation is obtained by following the process described in Luxembourg Pat. application No. 49,213, filed on July 30, 1965. Nevertheless, details of all the steps in this synthesis process will be given below.

Step 1: Preparation of 1-N-p-toluenesulfonylamino-2-nitro-4-methoxybenzene 0.12 mole (22,86 g.) of p-toluenesulfochloride is added slowly at 30° C. with constant stirring to a solution of 0.1 mole (16.8 g.) of 1-amino-2-nitro-4-methoxybenzene in 60 cm.³ of pyridine. When the addition 60 complete, the reaction mixture is kept at the ambient temperature for 6 hours. Then it is poured over 300 g. of ice to which 30 cm.³ of hydrochloric acid has been added, and dried. The crude product is redissolved in an ½-N sodium hydroxide solution. The obtained solution is filtered, then neutralized with hydrochloric acid. (4g. of the initial product are recovered being insoluble in the sodium hydroxide) 25 g. of 1-N-p-toluenesulfonylamino-2-nitro4-methoxybenzene are dried and, after recrystallization in alcohol, melt at 102° C. Analysis of the product yields the following results:

| Analysis | Calculated for $C_{14}H_{14}O_5N_2S$ | Found |
|---|---|---|
| C % | 52.17 | 52.09–52.28 |
| H % | 4.34 | 4.43–4.44 |
| N % | 8.69 | 8.74–8.92 |

Step 2: Preparation of the sodium derivative of 1-N-p-toluenesulfonylamino-2-nitro-4-methoxybenzene 0.155 mole of 1-N-p-toluenesulfonylamino-2-nitro-4-methoxybenzene are dissolved in 600 cm.³ of ½-N soda, then 250 cm.³ of 10 N sodium hydroxide are added to this solution with constant stirring. Drying yields 48 g. of the sodium derivative which are washed first with a little alcohol, then with a little acetone.

Step 3: Preparation of 1-(N-p-toluenesulfonyl-N-β-bromoethyl)-amino-2-nitro-4-methoxybenzene 0.0103 mole (3.56 g.) of the sodium derivative of 1-N-p-toluenesulfonylamino-2-nitro-4methoxybenzene is dissolved in 5cm.³ of dimethylformamide. 0.023 mole (2 cm.³) of 1,2-dibromoethane is added and the mixture is heated to reflux for 15 minutes and is then poured into 50 cm.³ of water. After extraction with ethyl acetate, the ethyl acetate solution is washed with ½-N sodium hydroxide to eliminate a little of the 1-N-p-toluenesulfonylamino-2-nitro-4-methoxybenzene. It is then washed with water. Concentration then yields about 10 cm.³ to which a little hexane is added. Drying yields 2.7 g. of 1-(N-p-toluenesulfonyl-N-β-bromoethyl)-amino-2-nitro-4-methoxybenzene, which, after recyrstallization in absolute alcohol, melts at 117° C. Analysis yields the following results:

| Analysis | Calculated for $C_{16}H_{17}N_2O_5S\ Br$ | Found |
|---|---|---|
| C % | 44.75 | 44.79–44.94 |
| H % | 3.96 | 4.17–4.14 |
| N % | 6.52 | 6.73–6.61 |

Step 4: Preparation of 1-N-β-bromoethylamino-2-nitro-4-methoxybenzene 0.093 mole (40 g.) of 1-(N-p-toluenesulfonyl-N-β-bromoethyl)-amino-2-nitro-4-methoxybenzene are dissolved in 160 cm.³ of concentrated sulfuric acid, the temperature being held between 0° and 5° C. The reaction mixture is left at 0° C. for 3 hours. Then it is poured over 1.2 kg. of crushed ice. Drying yields 25.1 g. of 1-N-β-bromoethylamino-2-nitro-4-methoxybenzene which, after recrystallization in a mixture of benzene and hexane, melts at 57° C. Analysis yields the following results:

| Analysis | Calculated for $C_9H_{11}N_2O_3Br$ | Found |
|---|---|---|
| C % | 39.27 | 39.41–39.36 |
| H % | 4.00 | 4.18– 4.20 |
| N % | 10.18 | 10.39–10.27 |

Step 5: Preparation of 1-N-β-phthalimidoethylamino-2-nitro-4-methoxybenzene 0.27 moles (74 g.) of 1-N-β-bromoethylamino-2-nitro-4-methoxybenzene are dissolved in 290 cm.³ of dimethylformamide. 0.32 moles (59.5 g.) of potassium phthalimide are added and the reaction mixture is heated to reflux for an hour. It is filtered while boiling, then the filtrate is cooled. Drying yields 79 g. of 1-N-β-phthalimidoethylamino-2-nitro-4-methoxybenzene which, after recrystallization in dioxane, melts at 212° C. Analysis of the product yields the following results:

| Analysis | Calculated for $C_{17}H_{15}N_3O_5$ | Found |
|---|---|---|
| C % | 59.82 | 59.61–59.73 |
| H % | 4.39 | 4.42– 4.60 |
| N % | 12.31 | 12.50–12.48 |

Step 6: Preparation of 1-N-β-aminoethylamino-2-nitro-4-methoxybenzene 0.1 mole (34.1 g.) of 1-N-β-phthalimidoethyl-amino-2-nitro-4-methoxybenzene in solution in 350 cm.³ of propanol is heated to reflux for an hour with 0.2 mole (10.2 g.) of hydrazine hydrate. The reaction mixture is boiled dry to eliminate the phthalylhydrazide formed. After the filtrate has been cooled, the small amount of unreacted initial product is recovered by filtration. The propanolic solution is then saturated with gaseous hydrochloric acid and drying yields 22.5 g. of the desired product in the form of a hydrochloride. This hydrochloride after recrystallization in water, when analyzed, yields the following results:

| Analysis | Calculated for $C_9H_{14}N_3O_3Cl$ | Found |
|---|---|---|
| C % | 43.63 | 43.79–43.80 |
| H % | 5.65 | 5.65– 5.70 |
| N % | 16.96 | 17.05–17.08 |

The 1-N-β-aminoethylamino-2-nitro-4-methoxybenzene isolated from this monohydrochloride in the usual manner melts at 57° C.

EXAMPLE V

Preparation of 1,4-diamino-5-γ-aminopropylaminoanthraquinone

The reaction used to prepare this compound may be diagrammatically represented in the following manner:

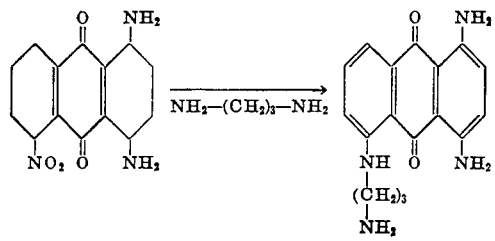

0.4 mole (113.2 g.) of 1,4-diamino-5-nitroanthraquinone is heated at 90° for 4 hours in 6 moles (444 g.) of 1,3-diaminopropane.

The reaction mixture is poured into 2 liters of cold water. Drying yields 109 g. of a crude product which is washed very carefully with water.

After two recrystallizations in propanol 72 g. of 1,4-diamino-5-γ-aminopropylaminoanthraquinone are obtained, which melt at 165° C.

Analysis of the product yields the following results:

| Analysis | Calculated for $C_{17}H_{18}O_2N_4$ | Found |
|---|---|---|
| C % | 65.80 | 65.83–65.61 |
| H % | 5.80 | 5.95–6.03 |
| N % | 18.03 | 17.78–17.90 |

EXAMPLE VI

Preparation of azo [(para-nitraniline) → (N-ethyl-N-β-aminoethyl-aniline)]

0.2 moles (27.6 g.) of para-nitraniline are diazotized in the conventional manner in a hydrochloric medium. A solution of 0.2 moles (32.8 g.) of N-ethyl-N-β-aminoethylaniline in 30 cm³ of acetic acid is added drop by drop, while maintaining the temperature at about 5° C., to the hydrochloric solution of diazonium salt thus obtained.

Drying yields 72 g. of this azo compound in the form of a monohydrochloride.

This hydrochloride is dissolved in boiling water and rendered alkaline. Drying yields 56.58 g. of the azo compound which, after recrystallization in alcohol and then in benzene, melts at 134° C.

Analysis of the product yields the following results:

| Analysis | Calculated for $C_{16}H_{19}N_5O_2$ | Found |
|---|---|---|
| C % | 61.34 | 61.35–61.30 |
| H % | 6.07 | 6.14–6.20 |
| N % | 22.36 | 22.44–22.29 |

EXAMPLE VII

Preparation of 2-β-aminoethylaminoanthraquinone

The preparation process may be diagrammatically represented in the following manner:

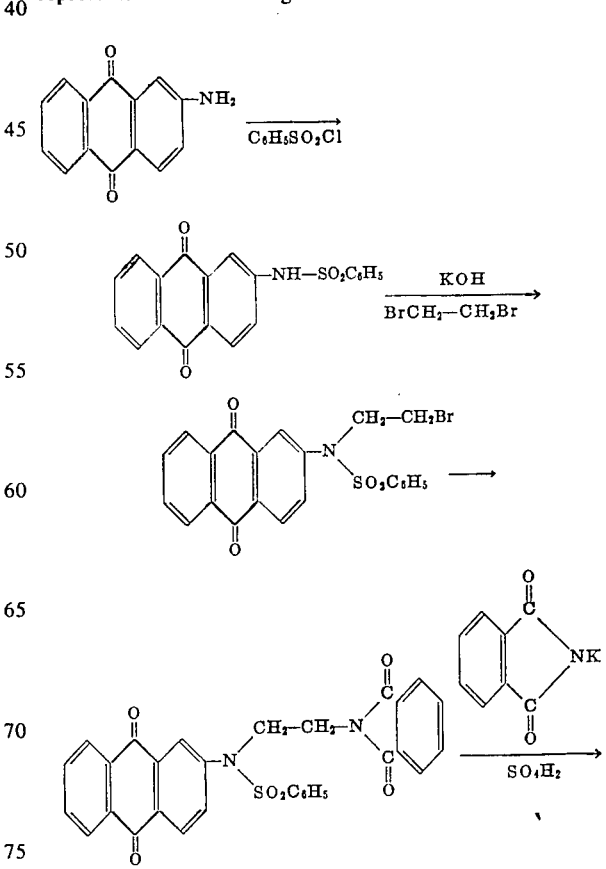

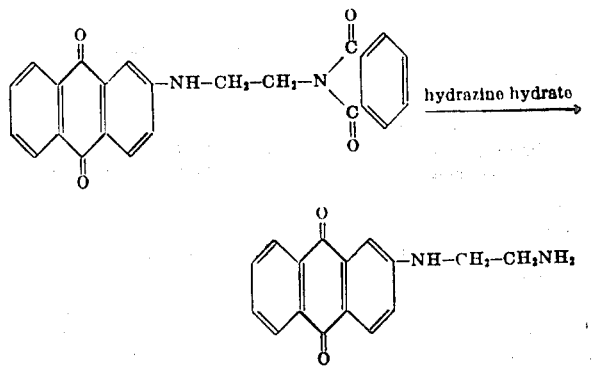

Step 1: Preparation of 2-N-benzenesulfonylaminoanthraquinone 1.32 moles (166 cm.³) of benzenesulfochloride are added little by little at 45° C. with constant stirring to a solution of 1 mole (223 g.) of 2-aminoanthraquinone in 1,800 cm.³ of pyridine. When the addition is complete the reaction mixture is kept at 45° C. for 4 hours. It is then cooled to 0° C. Drying yields the crude product which is then washed successively in slightly hydrochloric water, in water, and in alcohol. 320 g. of practically pure benzenesulfonamide are thus obtained, which melt at 276° C. 12 g. of slightly less pure benzenesulfonamide may be recovered from the pyridinic filtrate by dilution.

Step 2: Preparation of 2-(N-benezenesulfonyl-N-$\beta$-bromoethyl)—aminoanthraquinone 0.05 mole (18.15 g.) of 2-N-benezenesulfonyl aminoanthraquinone are dissolved in 90 cm.³ of dimethyl formamide at 60° C. 30.8 g. of potassium hydroxide in solution in 2 cm.³ of water and 6 cm.³ of alcohol are added, and then, as rapidly as possible, 0.1 mole (18.8 g.) of 1,2-dibromoethane. After the reaction mixture has been kept in a boiling water-bath for 2 hours, it is poured into a liter of ice water. Drying yields the crude product, which is treated with a ½-N sodium hydroxide solution to eliminate a little unreacted 2-N-benezenesulfonyl aminoanthraquinone. The product is then washed with water. 15g. of 2-(N-benzenesulfonyl-N-$\beta$-bromoethyl)—aminoanthraquinone are thus obtained which, after recrystallization in acetic acid, melt at 155° C.

Step 3: Preparation of 2-(N-benzenesulfonyl-N-$\beta$-phthalimidoethyl)-aminoanthraquinone 0.317 mole (148 g.) of 2-(N-benzenesulfonyl-N-$\beta$-bromoethyl)-aminoanthraquinone are dissolved in 675 cm.³ of dimethylformamide; then 0.412 mole (76.5 g.) of potassium phthalimide are added. The reaction mixture is carried to reflux for an hour, then cooled. Next it is poured into 6 liters of ice water. Drying yields 138 g. of a crude product which, after recrystallization in acetic acid, melts at 236° C.

Analysis of the product yields the following results:

| Analysis | Calculated for $C_{30}H_{20}N_2O_6S$ | Found |
|---|---|---|
| C % | 67.16 | 67.07–66.93 |
| H % | 3.73 | 3.87– 3.80 |
| N % | 5.22 | 5.27– 5.20 |

Step 4: Preparation of 2-N-$\beta$-phthalimidoethylaminoanthraquinone 0.225 moles (121 g.) of 2-(N-benezenesulfonyl-N-$\beta$-phthalimidoethyl)-aminoanthraquinone are dissolved in 600 cm.³ of concentrated sulfuric acid while maintaining the temperature between 25° and 30° C. The reaction mixture is left at the ambient temperature for 5 hours; then it is poured over 5 kg. of crushed ice. Drying yields 87 g. of 2-N-$\beta$-phthalimidoethyl aminoanthraquinone, which melts at 270° C.

Step 5: Preparation of 2-N-$\beta$-aminoethylaminoanthraquinone 0.21 mole (83 g.) of 2-N-$\beta$-phthalimidoethylaminoanthraquinone in solution in 300 cm.³ of diethyleneglycol is heated at 110° C. for 2 hours with 0.42 moles (21.5 g.) of 98% hydrazine hydrate. After cooling, the reaction mixture is poured into 1.500 liters of water. It is acidified by adding concentrated hydrochloric acid while stirring and is put in a boiling water-bath until the resultant hydrochloride dissolves. After cooling, drying yields 59 g. of the hydrochloride of 2-N-$\beta$-aminoethylaminoanthraquinone containing a little phthalhydrazide hydrochloride. This crude product is treated with 350 cm.³ of a 2-N potassium hydroxide solution. Drying yields 45 g. of practically pure 2-N-$\beta$-aminoethylaminoanthraquinone which, after recrystallization in pyridine, melts at 180° C.

Analysis of the product yields the following results:

| Analysis | Calculated for $C_{16}H_{14}N_2O_2$ | Found |
|---|---|---|
| C % | 72.18 | 72.43–72.35 |
| H % | 5.26 | 5.42– 5.35 |
| N % | 10.52 | 10.54–10.40 |

EXAMPLE VIII

The following hair coloring composition is prepared:

| | |
|---|---|
| 1-($\beta$-aminoethyl)-amino-2-nitro-4-methoxybenzene | 0.21 g. |
| Lauric alcohol oxyethylenated with 10.5 moles of ethylene oxide | 1.00 g. |
| 10% citric acid solution, q.s.p. | pH=9 |
| Water, q.s.p. | 100 cm.³ |

This composition is applied to "deep blonde" hair and left for 10 minutes. The hair is then rinsed and shampooed. A "deep copper mahogany" shade is obtained.

EXAMPLE IX

The following coloring composition is prepared:

| | |
|---|---|
| 4-methylamino-1-($\gamma$-aminopropyl)—aminoanthraquinone | 0.25 g. |
| lauric alcohol oxyethylenated with 10.5 moles of ethylene oxide | 5.00 g. |
| 10% citric acid solution, q.s.p | pH=7 |
| Water, q.s.p. | 100 cm.³ |

This composition is applied to brown hair with light "auburn" glints and left for 10 minutes. The hair is then rinsed and shampooed. A "blue black" shade is obtained.

EXAMPLE X

The following coloring composition is prepared:

| | |
|---|---|
| 4-methylamino-1-($\gamma$-aminopropyl)–aminoanthraquinone | 0.05 g. |
| 1-amino-2-nitro-4-methylamino benzene | 0.17 g. |
| 1-amino-3-nitro-6-($\gamma$-N-N-diethylaminopropyl)-aminobenzene | 0.11 g. |
| lauric alcohol oxyethylenated with 10.5 mols of ethylene oxide | 3.00 g. |
| ½-N sodium carbonate solution, q.s.p. | pH=9.5 |
| water, q.s.p. | 100 cm.³ |

This composition is applied to 100% white hair and left for 10 minutes. The hair is then rinsed and shampooed. A "deep ash blonde" shade is obtained.

EXAMPLE XI

The following coloring composition is prepared:

| | |
|---|---|
| 4-methylamino-1-($\gamma$-aminopropyl)aminoanthraquinone | 0.12 g. |
| 1-($\gamma$-aminopropyl)-aminoanthraquinone | 0.33 g. |
| 1-amino-2-methyl-4-nitro-5-($\gamma$-aminoethyl)-aminobenzene | 0.07 g. |
| lauric alcohol oxyethylenated with 10.5 mols of ethylene oxide | 3.5 g. |
| ½-N sodium carbonate solution, q.s.p. | pH=9 |
| water, g.s.p. | 100 cm.³ |

This composition is applied to 100% while hair and left for 10 minutes. The hair is then rinsed and shampooed. A "strong steel grey" shade is obtained.

EXAMPLE XII

The following coloring composition is prepared:

| | |
|---|---|
| 1,4-diamino-5-γ-aminopropylaminoanthraquinone | 0.13 g. |
| lauric alcohol oxyethylenated with 10.5 mols of ethylene oxide | 5 g. |
| water, q.s.p. | 100 g. |

The pH of this composition is 9.5. It is applied to bright chestnut hair with golden glints and left for 10 minutes. The hair is then rinsed and shampooed.

This yields a chestnut shade with ashy glints.

EXAMPLE XIII

The following coloring composition is prepared:

| | |
|---|---|
| 1,4-diamino-5-γ-aminopropylaminoanthraquinone | 0.060 g. |
| 1-γ-aminopropylaminoanthraquinone | 0.075 g. |
| 4-nitro-3-β-aminoethylamino-N,N-dimethylaniline | 0.015 g. |
| lauric alcohol oxyethylenated with 10.5 mols of ethylene oxide | 5 g. |
| 20% citric acid solution q.s.p. | pH=7 |
| water, q.s.p. 100 g. | |

This composition is applied to 90% white hair and left for 10 minutes. The hair is then rinsed and shampooed.

This yields a strong grey with light mauve overtones.

EXAMPLE XIV

The following coloring composition is prepared:

| | |
|---|---|
| monoazo[(P-nitraniline) → (N-ethyl-N-β-aminoethyl-aniline)] | 0.5 g |
| n-butyl ether of ethyleneglycol | 25 g. |
| β-naphthol oxyethylenated with 6.4 mol of ethylene oxide | 12.5 g |
| water, q.s.p | 100 g |

This solution is applied to natural grey hair in the ratio of 1 volume of solution to an equivalent weight of hair. It is left for 30 minutes at the ambient temperature.

After rinsing, shampooing and drying, a moderate red-orange shade is obtained.

EXAMPLE XV

The following solution A is prepared:

| | |
|---|---|
| 1,4-diamino-5-N-(γ-aminopropyl)-aminoanthraquinone | 2 g. |
| monoazo [(p-nitraniline) → (N-ethyl-N-β-aminoethylaniline)] | 2 g. |
| n-butyl monoether of ethylene glycol, q.s.p. | 100 g. |

The coloring composition is obtained by diluting solution A in the ratio of:

1 volume of β-naphthol oxyethylenated with 6.4 mols of ethylene oxide
5 volumes of water
2 volumes of solution A.

The composition thus prepared is applied to natural grey hair in the ratio of 1 volume of solution to an equivalent weight of hair and left for 30 minutes at the ambient temperature.

After rinsing, shampooing and drying, a purple grey shade is obtained.

EXAMPLE XVI

| | |
|---|---|
| 2-β-aminoethylaminoanthraquinone | 0.1 g. |
| isooctylphenyl-polyethoxyethanol | 5 g. |
| 2-butoxyethanol | 6 g. |
| 1 N CO₃Na₂ solution, q.s.p | pH=8 |
| water, q.s.p. | 100 g. |

This composition is applied to 90% white hair and left for 20 minutes. The hair is then rinsed and shampooed.

This yields a mahogany blonde shade.

EXAMPLE XVII

The following setting and coloring lotion is prepared:

| | |
|---|---|
| polyvinyl pyrrolidone | 2 g. |
| 1-γ-aminopropylaminoanthraquinone | 0.020 g. |
| 1,4-diamino-5-γ-aminopropylaminoanthraquinone | 0.028 g. |
| 2-β-aminoethylaminoanthraquinone | 0.036 g. |
| ethyl alcohol at 96° | 50 cm.³ |
| water, q.s.p. | 100 cm.³ |

The pH of this solution is adjusted to 7 with a normal solution of sodium carbonate.

This lotion is applied before the set without rinsing, and the hair is arranged as usual before drying.

70% white hair turns a strong violet grey while setting.

What is claimed is:

1. A composition for coloring human hair comprising an aqueous solution of a hair coloring amount of a dye compound selected from the group consisting of 4-methylamino-1-(β-aminoethyl)-aminoanthraquinone, 4-methylamino-1-γ-aminopropyl)-aminoanthraquinone, 1-(γ-aminopropyl)-aminoanthraquinone, 1-(β-amino- ethyl)-amino-2-nitro-4-methoxybenzene, 1,4-diamino-5-aminopropylaminoanthraquinone, azo -[(para-nitraniline)-(N-ethyl-N-β-aminoethylaniline)] and 2-β-aminoethylaminoanthraquinone, said composition containing 0.01 to 3 percent of said dye compound and having a pH of about 4–10.

2. A method of coloring keratinic fibers comprising impregnating said fibers at ambient temperature with keratin fiber coloring amounts of the composition of claim 1.

3. A method of coloring human hair comprising applying to said hair a hair coloring amount of the composition of claim 1.

4. The method of claim 3 in which said composition is left in contact with said hair for 5 to 30 minutes and then the hair is rinsed and dried.

* * * * *